Figure 1:
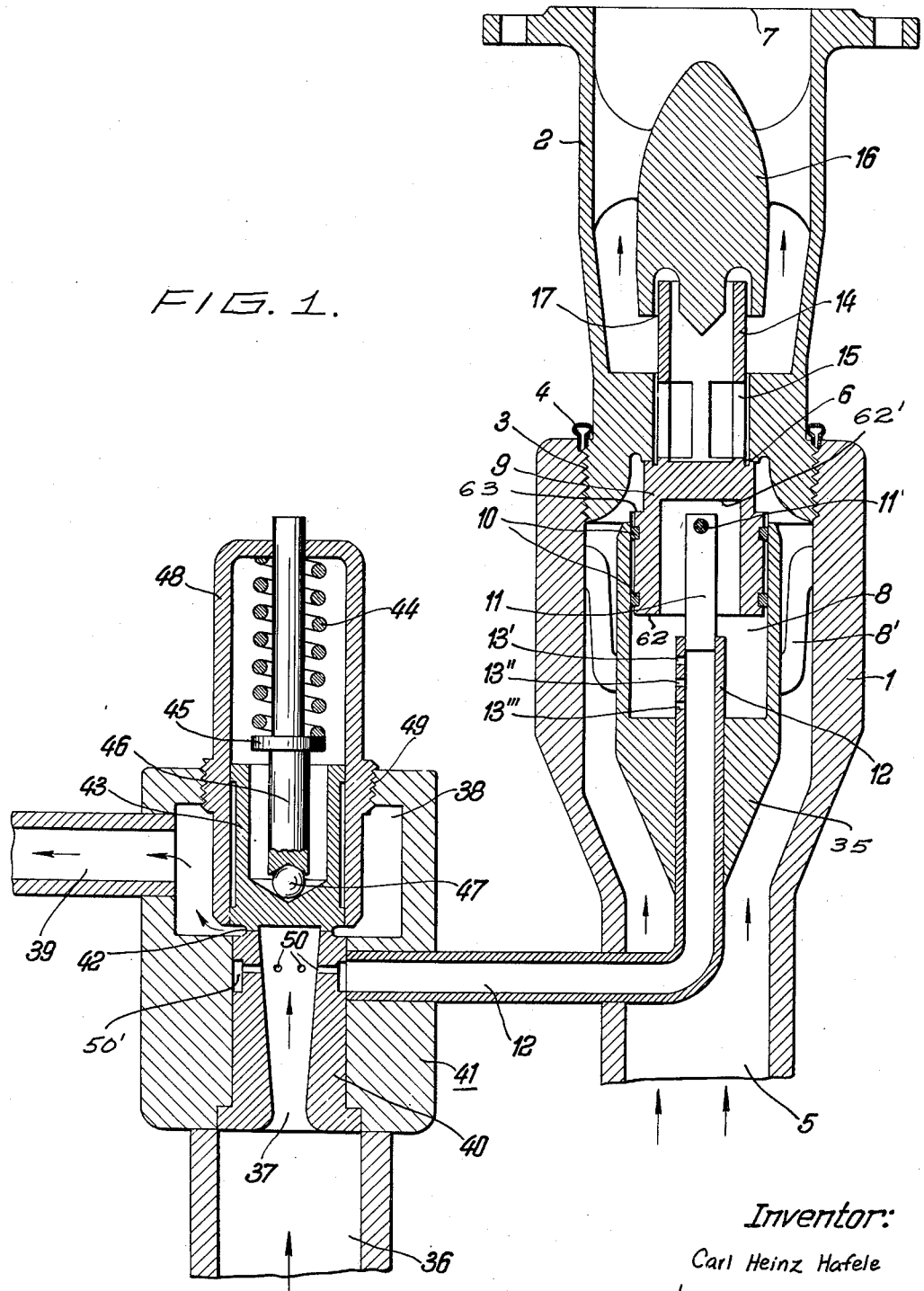

ବ୍ତ2,814,307

PILOT CONTROLLED MAIN VALVE WITH CUSHIONING MEANS

Carl Heinz Hafele, M. Gladbach, and Alfred Kreuz, Gusten, Germany, assignors to Rheinische Armaturen- und Maschinenfabrik Albert Sempell, M. Gladbach, Germany Application December 4, 1953, Serial No. 396,142

Claims priority, application Germany December 5, 1952

10 Claims. (Cl. 137—489)

The present invention relates to valve devices.

More particularly, the present invention relates to shut-off valves in which the closure member of the valve is movable in the direction of flow of the fluid medium whose flow is to be controlled by the shut-off valve. In particular, the invention concerns a valve of the above type wherein braking means are provided to retard the closing and opening movements of the closure member. This type of device operates in such manner that the valve closes when the operating pressure falls below a predetermined amount and opens when the operating pressure exceeds the predetermined value.

In shut-off devices of this type wherein the valve cone is tightly closed in its shut-off position by pressure of the fluid medium, the impacts exerted on the valve in its movements into its closed and open positions are so great that damage is frequently caused to the valve parts.

It is an object, therefore, of the present invention to provide a shut-off valve device of the above type which avoids the above mentioned disadvantage.

It is another object of the present invention to provide a valve device of the above type wherein the closing and opening movements of the valve closure member are retarded.

It is still another object of the present invention to provide a valve device of the above type wherein the parts of the device are symmetrically arranged about the axis of the valve housing.

Other objects and advantages will become apparent from the following description and the appended claims.

With the above objects in view, the present invention in its broad aspects mainly consists in a valve device which comprises a valve housing including an inlet portion and an outlet portion communicating with each other and through which a fluid medium is adapted to flow, the housing having a valve seat portion arranged between the inlet and outlet portions, closure means mounted in the valve housing for movement therein between a closed position engaging the valve seat portion and an open position spaced from the valve seat portion, first braking means operable by the fluid pressure exerted by the fluid medium adapted to flow through the housing for retarding the movement of the closure means toward its closed position, and second braking means operable by a control medium for retarding the movement of the closure means toward its open position.

Figure 2:
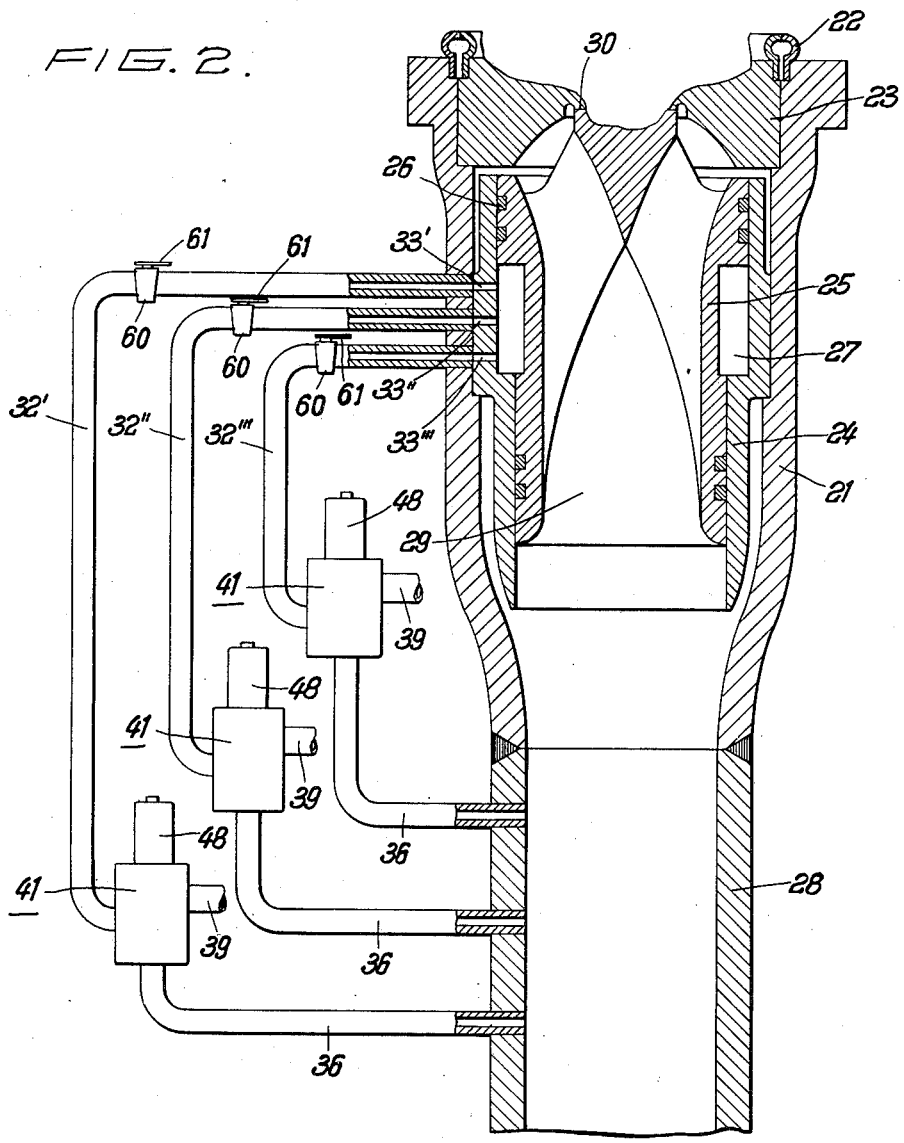

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a longitudinal section of one embodiment according to the present invention, together with a control valve therefor; and Fig. 2 is a longitudinal section of another embodiment of the present invention.

Referring now to the drawings, and particularly to Fig. 1, there is shown a shut-off device constructed in accordance with the invention which includes a housing having a substantially cylindrical body 1 enclosing the high pressure portion of the device, and a substantially cylindrical body 2 enclosing the low pressure portion of the housing. Both bodies 1 and 2 are connected to each other by means of a threaded portion 3 and an annular weld seal 4. At one end of the housing is an inlet passage 5, at the other end is located an outlet passage 7, and between these two passages is a valve seat 6, the passages 5 and 7 and the valve seat 6 being aligned along a common geometrical axis. Due to the arrangement of cylindrical bodies 1 and 2 and the remaining parts of the shut-off device symmetrically about the longitudinal axis of the housing, any changes caused in the shapes of these parts due to heat expansion occur symmetrically about the axis, so that the operation of the shut-off device is reliable at all temperatures.

In the high pressure portion 1 of the housing, there is provided a hollow member 35 mounted on body 1 by means of resilient steel ribs 8', hollow member 35 having a cylindrical chamber 8 formed therein. Slidably mounted in chamber 8 is a piston 9 which is provided with piston rings 10 slidably engaging the walls of chamber 8 in fluid tight engagement. In the arrangement shown in Fig. 1, the piston 9, which serves as a valve body, is in its closed position and presses against the valve seating surface 6 on the housing portion 2.

A damping piston 11 is secured to piston 9 by means of a pin 11', the damping piston 11 being arranged to reciprocate within the upper portion of a tube 12 which extends from the exterior of housing portion 1 into the housing, through hollow member 35 and opens into chamber 8. In the upper portion of tube 12 in which damping piston 11 is adapted to reciprocate there is formed a plurality of openings 13', 13", and 13''' which open into chamber 8.

As a result of the arrangement above described, the ports 13'—13''' may be successively opened and closed by the upward and downward movements, respectively, of the damping piston 11. Tube 12 is connected to a control device 41, which will be described below, such that under the effect of controlled pressure of a fluid, e. g. gaseous or liquid control medium conducted to chamber 8 through tube 12, the device can operate in accordance with the principle of a differential valve, i. e., the pressure exerted by the control medium in the faces 62 and 62' of the piston 9 tends to move the same upwardly, as viewed in Fig. 1, and the pressure exerted on the face 63 by the fluid flowing through the device tends to move the piston 9 downwardly.

Mounted at the upper end of piston 9 is a tubular member 14 formed with passage openings 15. Tubular member 14 extends from piston 9 into the outlet portion 2 of the valve housing and is movable toward a stationary damping member 16 mounted in housing portion 2. Damping member 16 is formed on the surface thereof facing tubular member 14 with an annular recess 17 in which the open end of tubular member 14 is adapted to be received when it moves forwardly during the closing movement of piston 9. It will be seen that the extent to which the open end of tubular member 14 projects into recess 17 is dependent on the position of the valve closure piston 9. As shown in the drawing, hollow member 35, piston 9 and tubular member 14 are arranged rotationally symmetrical about the geometrical axis of the housing.

The control device 41 illustrated in Fig. 1 is a preferred embodiment of a suitable control valve which may be used in conjunction with the shut-off device described above.

The control valve 41 comprises an inlet passage 36, a nozzle 37, an annular chamber 38 and an outlet passage 39. A nozzle body 40 is rigidly mounted in the cylindrical body of the control valve, the upper part of the nozzle body 40 forming a valve seat 42. A piston 43 which serves as a valve body is kept in contact with the valve seat 42 by means of a suitable biasing arrangement which includes a pressure spring 44, a spring washer 45, a rod 46 and a ball 47.

The valve body 43 is slidably mounted in an upper cylindrical portion 48 of the control valve, which portion 48 is connected to the cylindrical valve body by means of a thread 49.

The nozzle body 40 is formed with a number of bores 50 which are in communication with an annular chamber 50' which, in turn, is in communication with the tube 12.

The operation of the device shown in Fig. 1 is as follows:

In the normal operating condition, the fluid medium which is conducted to chamber 8 through tube 12 has the operating pressure. Under these conditions the valve device operates as a shut-off valve, since the pressure in housing portion 2 is smaller than in the high pressure portion 1.

When the valve is to be opened, the pressure of the fluid control medium in tube 12 and in chamber 8 is reduced below the operating pressure. As a result, piston 9 moves rearwardly away from the valve seat 6 and the valve is thereby opened. The damping piston 11, which is secured to piston 9, also moves rearwardly, and during its rearward movement it successively closes ports 13', 13", and 13''', so that by the rearward motion of the piston 9 in cylindrical chamber 8 the fluid medium in chamber 8 is allowed to escape into tube 12 in successively smaller amounts. When the damping piston 11 has closed the last port 13''', the fluid medium trapped in chamber 8 can no longer escape. In the event the fluid medium involved is gaseous, it will be compressed by the piston 9. As a result, the latter is retarded and braked during its rearward movement in the manner desired.

The shut-off device is now open, and the main stream of the fluid medium in the housing passes through inlet 5, valve seat 6, passage apertures 15, and tubular member 14 to outlet 7.

If it is desired to again close the valve, the fluid control medium is conducted into chamber 8 through tube 12 at full operating pressure. Piston 9 then moves forwardly in the direction of closing. In this way, tubular member 14 approaches and projects into the annular recess 17 of damping member 16. The closer piston 9 approaches its closed position, the smaller becomes the cross section of the flow passage of the fluid medium through recess 17. Since a greater amount of the fluid medium can pass into tubular member 14 through passage apertures 15 than can leave member 14 through recess 17, the pressure of the fluid medium within tubular member 14 rises and is exerted against piston 9 in opposition to the closing movement thereof. In this way the closing movement of piston 9 is retarded in an effective manner.

The pressure prevailing within the tube 12 is controlled as follows:

A fluid control medium is introduced into the control valve 41 through the inlet passage 36. If desired, the control fluid medium may be the medium the flow of which is to be controlled by the shut-off valve illustrated in the right-hand portion of Fig. 1.

When the pressure of the fluid medium introduced into the inlet passage 36 exceeds the operating pressure, the spring 44 is compressed and the valve body 43 moves away from the valve seat 42 and the valve control is thereby opened. The fluid medium is allowed to escape through the outlet passage 39.

It will be understood that the spring constant of the spring 44 will control the pressure at which the valve body 43 moves away from the valve seat 42. The spring 44 may be selected so as to permit movement of the valve body 43 at any desired pressure exerted by the fluid medium introduced through the inlet passage 36.

In accordance with known physical principles, the pressure of the fluid medium in the annular chamber 50' is reduced below the operating pressure. This reduced pressure will then prevail in the tube 12 so as to control the shut-off valve in the manner described above.

If the pressure of the fluid medium introduced into the inlet passage 36 drops below the operating pressure, the valve body 43 closes the control valve 41 whereupon the pressure prevailing within the annular chamber 50', and consequently in the tube 12, increases and the shut-off valve is moved to its closed position.

Where even greater requirements exist, a stepwise opening movement of the valve can be provided by means of relief valves or auxiliary control valves. For example there may be provided an arrangement wherein the shut-off valve opens about 10% at a particular pressure, and wherein at a certain higher pressure, 40% of the total flow passage cross section is opened, and then only at a higher pressure would the entire cross section of flow passage be opened.

This arrangement can be obtained by connecting each of the ports 13', 13", and 13''' shown in Fig. 1 to a control conduit which maintains the necessary pressure independently of the other conduits for adjusting the shut-off device. If the control conduit connected to opening 13' has a lower pressure than the operating pressure, the valve opens to such an extent that the damping piston 11 closes port 13', and so on with respect to the other ports.

Fig. 2 shows a further embodiment of such a device in accordance with the invention.

In this figure, there is shown a housing body 21 in the high pressure portion of the valve housing, body 21 being provided with a valve seat member 23 which is sealed with respect to body 21 by means of a weld joint 22, the parts being constructed rotationally symmetrically with respect to the axis of the housing. Mounted in body 21 is a sleeve 24 in which a hollow differential piston 25 is slidably arranged, piston 25 having piston rings 26 engaging the inner surface of sleeve 24 in fluid tight engagement. Between sleeve 24 and differential piston 25 there is formed an annular chamber 27. Inlet passage 28, piston 25, valve seat 30 and the outlet passage are aligned along a common geometrical axis.

The device of Fig. 2 is provided with a damping structure in the outlet portion of the housing corresponding to that shown in Fig. 1. This structure comprises a cylindrical body 2' having an outlet passage 31. The body 2' has a base portion 23 which is arranged within the top portion of a tubular casing 21. The latter carries a hollow member 24 within which a piston 25 is slidably arranged. The piston 25 carries at its top a tubular member 14' which has passage openings 15' in its wall and is movable within a constricted housing portion, similar to the arrangement of tubular member 14 shown in Fig. 1. The tubular member is adapted to project into an annular recess 17' of a stationary damping member 16' for damping the closing movement of piston 25, in the manner and by the means substantially as described with respect to the device shown in Fig. 1.

In the closing position of the shut-off device shown in Fig. 2, there is introduced into chamber 27 a first control pressure via tube 32' and port 33', a second control pressure via tube 32" and port 33", and a third control pressure via tube 32''' and port 33'''. The three tubes 32', 32" and 32''' are provided with a control pressure by three pressure responsive control valves 41 to which they are connected. The control valves 41 may, if desired, be of the type illustrated in Fig. 1 so that the tubes 32', 32" and 32'" are in communication with the respective annular chambers 50' of the control valves 41.

If desired, additional valve means 60 may be provided in the tubes 32', 32" and 32'", as is shown in Fig. 2. Suitable operating means 61 may be provided for each valve 60.

In the arrangement illustrated in Fig. 2, the control medium is the medium the flow of which is to be controlled by the shut-off valve. It will be understood, however, that any other suitable fluid medium may be introduced through the inlet passage 36 of the several control valves 41, or that totally different control valve means may be provided to control the pressures prevailing in the tubes 32', 32" and 32'". These valves 60 act as additional valves by means of which the respective lines can be closed, it having been found, in practice, that such additional manual control valves are desirable in order to enable the lines to be closed so as to permit disconnection thereof for cleaning or other purposes.

The operation of the device shown in Fig. 2 is as follows:

To open the shut-off device, a control pressure is established in tube 32' which is lower than the operating pressure, so that as a result of the higher operating pressure in the valve housing acting to open differential valve 25, the latter valve is moved to such an extent rearwardly that the port 33' is closed, aside from any slight leaks which might be present between piston rings 26 and sleeve 24. The adjustment of piston 25 to this new position results in a quickly fading, damped oscillation, similar to that already described. The shut-off device is now partly opened.

If the shut-off device is to be opened further, the control pressure in tube 32" is reduced, and there follows the further opening of the shut-off device. If the entire cross section of the outlet passage is to be cleared, then finally the control pressure in the tube 32'" is reduced.

It will be understood that each of the elements described above, or two or more together, may also find a useful application in other types of valve devices differing from the types described above.

While the invention has been illustrated and described as embodied in valve devices having an axially movable closure member, it is not intended to be limited to the details shown, since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A valve device, comprising, in combination, a valve housing including an inlet portion and an outlet portion communicating with each other and through which a fluid medium may flow, said housing having a valve seat portion arranged between said inlet and outlet portions; a hollow member arranged in said housing and defining a chamber; closure means comprising a piston member extending into said chamber of said hollow member in fluid tight slidable engagement therewith for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position; and second braking means operable by a fluid medium for retarding the movement of said closure means toward its open position, said second braking means comprising conduit means opening into said chamber and extending to the exterior of said housing for conducting fluid medium to said chamber for operating and retarding said piston member, said conduit means comprising a plurality of duct members opening into said chamber, each duct member being adapted to be successively closed by said piston member during its movement toward its open position for gradually retarding said movement of said piston member, said conduit means having means for individually closing said duct members independently of said piston member.

2. A valve device, comprising, in combination, a valve housing including an inlet portion and an outlet portion communicating with each other and through which a fluid medium may flow, said housing having a valve seat portion arranged between said inlet and outlet portions; closure means comprising a piston member mounted in said valve housing for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member formed with an annular recess therein and mounted in said housing, and a movable tubular member secured to said piston member for movement therewith into and out of said annular recess of said stationary member, said movable tubular member being so arranged that during closing movement of said piston member said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position.

3. A valve device, comprising, in combination, a valve housing including an inlet portion and an outlet portion communicating with each other and through which a fluid medium may flow, said housing having a valve seat portion arranged between said inlet and outlet portions; closure means comprising a piston member mounted in the inlet portion of said valve housing for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member mounted in said housing in the outlet portion thereof and having a rearwardly facing surface formed with an annular recess, and a movable tubular member secured to said piston member for movement therewith toward and away from said stationary member, said tubular member having an open end movable into said annular recess of said stationary member, said movable tubular member being so arranged that during closing movement of said piston member said open end of said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position.

4. A valve device, comprising, in combination, a valve housing including an inlet portion and an outlet portion communicating with each other and through which a fluid medium may flow, said housing having a valve seat portion arranged between said inlet and outlet portions; closure means comprising a piston member mounted in the inlet portion of said valve housing for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member mounted in said housing in the outlet portion thereof and having a rearwardly facing surface formed with an annular recess, and a movable tubular member secured to said piston member for movement therewith toward and away from said stationary member, said tubular member having an open end movable into said annular recess of said stationary member and being formed with at least one aperture in its wall for passage of the fluid medium thereinto, said movable tubular member being so arranged that during closing movement of said piston member said open end of said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position.

5. A valve device, comprising, in combination, a valve housing including an inlet portion and an outlet portion communicating with each other and through which a fluid medium may flow, said housing having a valve seat portion arranged between said inlet and outlet portion; a hollow member arranged in said housing and defining a chamber; closure means comprising a piston member extending into said chamber of said hollow member in fluid tight slidable engagement therewith for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member formed with an annular recess therein and mounted in said housing, and a movable tubular member secured to said piston member for movement therewithin into and out of said annular recess of said stationary member, said movable tubular member being so arranged that during closing movement of said piston member said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position, said second braking means comprising conduit means opening into said chamber and extending to the exterior of said housing for conducting fluid medium to said chamber for operating and retarding said piston member.

6. A valve device, comprising, in combination, a valve housing including an inlet portion and an outlet portion communicating with each other and through which a fluid medium may flow, said housing having a valve seat portion arranged between said inlet and outlet portions; a hollow member arranged in said housing and defining a chamber; closure means comprising a piston member extending into said chamber of said hollow member in fluid tight slidable engagement therewith for movement therein between a closed position engaging said valve seat portion and an open position spaced from said valve seat portion, said piston member being movable forwardly toward its closed position in the direction of flow of said fluid medium and rearwardly toward its open position, said inlet, outlet and valve seat portions and said closure means being aligned along the axis of said housing and being arranged symmetrically about said axis; first braking means operable by the fluid pressure exerted by the fluid medium flowing through said housing for retarding the movement of said closure means toward its closed position, said first braking means comprising a stationary member formed with an annular recess therein and mounted in said housing, and a movable tubular member secured to said piston member for movement therewith into and out of said annular recess of said stationary member, said movable tubular member being so arranged that during closing movement of said piston member said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position, said second braking means comprising conduit means opening into said chamber and extending to the exterior of said housing for conducting fluid medium to said chamber for operating and retarding said piston member.

7. A valve device, comprising, in combination, a valve housing including an inlet portion and an outlet portion communicating with each other and through which a fluid medium may flow, said housing having a valve seat portion arranged between said inlet and outlet portions; a hollow member arranged in said housing and defining a chamber; closure means comprising a piston member extending into said chamber of said hollow member in fluid tight slidable engagement therewith for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member formed with an annular recess therein and mounted in said housing, and a movable tubular member secured to said piston member for movement therewith into and out of said annular recess of said stationary member, said movable tubular member being so arranged that during closing movement of said piston member said movable tubular member projects into said recess but remains radially spaced from said stationary member, whereby when said piston member approaches said stationary member the flow passage of said fluid medium between said tubular and stationary members is reduced, thereby retarding the closing movement of said piston member;

and second braking means operable by a fluid medium for retarding the movement of said closure means toward its open position, said second braking means comprising conduit means opening into said chamber and extending to the exterior of said housing for conducting fluid medium to said chamber for operating and retarding said piston member, said conduit means being formed with a plurality of longitudinally spaced ports communicating with said chamber, said second braking means also comprising an elongated member secured to said piston member for movement therewith and fitting into said conduit means for successively closing said ports thereof during movement of said piston member toward its open position, whereby the passage of the fluid medium into said conduit means from said chamber is gradually retarded.

8. A valve device, comprising, in combination, a valve housing including an inlet portion and an outlet portion communicating with each other and through which a fluid medium may flow, said housing having a valve seat portion arranged between said inlet and outlet portions; a hollow member arranged in said housing and defining a chamber; closure means comprising a piston member extending into said chamber of said hollow member in fluid tight slidable engagement therewith for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member formed with an annular recess therein and mounted in said housing, and a movable tubular member secured to said piston member for movement therewith into and out of said annular recess of said stationary member, said movable tubular member being so arranged that during closing movement of said piston member said movable tubular member projects into said recess but remains radially spaced from said stationary member, whereby when said piston member approaches said stationary member the flow passage of said fluid medium between said tubular and stationary members is reduced, thereby retarding the closing movement of said piston member; and second braking means operable by a fluid medium for retarding the movement of said closure means toward its open position, said second braking means comprising conduit means opening into said chamber and extending to the exterior of said housing for conducting fluid medium to said chamber for operating and retarding said piston member, said conduit means comprising a plurality of duct members opening into said chamber, each duct member being adapted to be successively closed by said piston member during its movement toward its open position for gradually retarding said movement of said piston member.

9. A valve device, comprising, in combination, a valve housing including an inlet portion and an outlet portion communicating with each other and through which a fluid medium may flow, said housing having a valve seat portion arranged between said inlet and outlet portions; closure means comprising a piston member mounted in said valve housing for movement therein between a closed position engaging said valve seat portion and an open position spaced from said valve seat portion, said piston member being movable forwardly toward its closed position in the direction of flow of said fluid medium and rearwardly toward its open position; first braking means operable by the fluid pressure exerted by the fluid medium flowing through said housing for retarding the movement of said closure means toward its closed position, said first braking means comprising a stationary member mounted in said housing, and a movable tubular member secured to said piston member for movement therewith toward and away from said stationary member, said fluid medium passing through said tubular member and between said tubular and stationary members, said movable tubular member being arranged to approach said stationary member during closing movement of said piston member so as to reduce the flow passage of said fluid medium between said tubular and stationary members to thereby retard the closing movement of said piston member, said inlet, outlet and valve seat portions, said piston member of said closure means, and said stationary and tubular members of said first braking means being aligned along the axis of said housing; and second braking means operable by a fluid medium for retarding the movement of said closure means toward its open position.

10. A valve device, comprising, in combination, a valve housing including an inlet portion and an outlet portion communicating with each other and through which a fluid medium may flow, said housing having a valve seat portion arranged between said inlet and outlet portions; closure means comprising a piston member mounted in said valve housing for movement therein between a closed position engaging said valve seat portion and an open position spaced from said valve seat portion, said piston member being movable forwardly toward its closed position in the direction of flow of said fluid medium and rearwardly toward its open position; first braking means in the path of the entire fluid medium flowing through said housing and operable by the fluid pressure exerted thereby for retarding the movement of said closure means toward its closed position, said first braking means comprising a stationary member mounted in said housing, and a movable tubular member secured to said piston member for movement therewith toward and away from said stationary member so that said fluid medium may pass through said tubular member and between said tubular and stationary members, said movable tubular member being arranged to approach said stationary member during closing movement of said piston member so as to reduce the flow passage of said fluid medium between said tubular and stationary members to thereby retard the closing movement of said piston member; and second braking means operable by a fluid medium for retarding the movement of said closure means toward its open position.

References Cited in the file of this patent

UNITED STATES PATENTS

| | | |
|---|---|---|
| 611,053 | Cameron | Sept. 20, 1898 |
| 793,788 | Hochfeldt | July 4, 1905 |
| 1,466,412 | Samain | Aug. 28, 1923 |
| 1,511,009 | Spear | Oct. 7, 1924 |
| 1,598,166 | Stewart | Aug. 31, 1926 |
| 1,646,640 | Daniel | Oct. 25, 1927 |
| 1,829,703 | Larner | Oct. 27, 1931 |
| 2,590,466 | Rued | Mar. 25, 1952 |

FOREIGN PATENTS

| | | |
|---|---|---|
| 173,665 | Germany | July 26, 1906 |
| 480,742 | Great Britain | Feb. 28, 1938 |